(12) United States Patent
Kim et al.

(10) Patent No.: US 8,560,194 B2
(45) Date of Patent: Oct. 15, 2013

(54) SHIFTING RANGE SENSING APPARATUS

(75) Inventors: Eunsik Kim, Daegu (KR); Dohyon Won, Suwon-si (KR); Kangyoung Kim, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 402 days.

(21) Appl. No.: 12/880,968

(22) Filed: Sep. 13, 2010

(65) Prior Publication Data
US 2011/0137534 A1    Jun. 9, 2011

(30) Foreign Application Priority Data
Dec. 3, 2009  (KR) .................. 10-2009-0119032

(51) Int. Cl.
*B60K 20/02* (2006.01)
*F16H 59/08* (2006.01)
*F16H 59/10* (2006.01)
*F16H 59/02* (2006.01)
*F16H 61/12* (2010.01)

(52) U.S. Cl.
CPC .......... *F16H 59/105* (2013.01); *F16H 59/0204* (2013.01); *F16H 61/12* (2013.01); *B60K 20/02* (2013.01)

USPC ............... 701/62; 701/63; 701/64; 180/336; 180/332; 74/473.3; 324/207.2; 324/207.25

(58) Field of Classification Search
USPC .......................................... 180/336; 74/473.3
See application file for complete search history.

(56) References Cited

U.S. PATENT DOCUMENTS

| 6,851,538 | B2 |  | 2/2005 | Meyer et al. |  |
|---|---|---|---|---|---|
| 7,086,306 | B2 | * | 8/2006 | Syamoto et al. | 74/473.33 |
| 2004/0237692 | A1 | * | 12/2004 | Syamoto et al. | 74/473.12 |
| 2012/0137810 | A1 | * | 6/2012 | Kim et al. | 74/473.1 |

FOREIGN PATENT DOCUMENTS

| JP | 6-280977 A |  | 10/1994 |  |
|---|---|---|---|---|
| JP | 2003-154868 A |  | 5/2003 |  |
| JP | 2003-154869 A |  | 5/2003 |  |
| JP | 2003154868 A | * | 5/2003 | ............ B60K 20/02 |
| JP | 2007-182220 A |  | 7/2007 |  |
| KR | 10-2007-0060735 A |  | 6/2007 |  |

* cited by examiner

*Primary Examiner* — Shelley Chen
(74) *Attorney, Agent, or Firm* — Morgan, Lewis & Bockius LLP

(57) ABSTRACT

A shifting range sensing system, may include a shift lever pivotally connected to a vehicle body, a shift range sensing apparatus to sense a pivotal movement of the shift lever, an inhibitor switch mounted in a transmission, and a controller taking an emergency measure when a signal of the inhibitor switch and a signal of the shifting range sensing apparatus do not indicate the same shifting range.

6 Claims, 9 Drawing Sheets

SHIFTING RANGE SENSING APPARATUS

CROSS-REFERENCE TO RELATED APPLICATIONS

The present application claims priority to Korean Patent Application Number 10-2009-0119032 filed Dec. 3, 2009, the entire contents of which application is incorporated herein for all purposes by this reference.

BACKGROUND OF THE INVENTION

1. Field of the Invention

The present invention relates to a shifting range sensing apparatus, in more detail, an apparatus for detecting the current shifting range from the operation of a shifting lever.

2. Description of Related Art

In automatic transmission vehicles of the related art, operational force of a shift lever that is operated by a driver is transmitted to an inhibitor switch and a manual valve of a valve body in the automatic transmission through a cable.

Accordingly, even it the inhibitor switch transmits incorrect information due to a failure, the manual valve mechanically receives the operational force of the shift lever and operates, such that the vehicle could be safely controlled.

In the DCT (Double Clutch Transmission), however, since a controller operates a motor in response to a signal from an inhibitor switch to perform shifting, such that when incorrect information is transmitted to the controller due to a failure of the inhibitor switch, safe control of the vehicles could not be ensured.

That is, when a driver moves the shift lever to the N-range and the inhibitor switch transmits an R-range signal due to a failure, the controller correspondingly release the DCT, and as a result, the driver is exposed to a danger of accident by unexpected reverse of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shifting range sensing apparatus that makes it possible to ensure safety in vehicle control, by providing accurate information on a shift range selected by a driver supplementarily from the operation of a shift lever, even if an inhibitor switch mounted in a transmission transmits incorrect information due to a failure in vehicles equipped with a DCT etc.

In an aspect of the present invention, the shifting range sensing apparatus may include a housing fixed to a vehicle body, a shift lever pivotally connected to the vehicle body, a magnet rotatably connected to the housing therein, a power transfer unit transmitting a pivotal rotation of the shift lever to the magnet in accordance with a rotation of the shift lever to move the magnet, and a Hall sensor fixed in the housing to sense the movement of the magnet.

The power transfer unit may include a connecting rod connected with the magnet and protruding outside the housing, and a connection groove formed in the shift lever to rotatably receive the connecting rod therein, wherein the connecting rod is integrally formed with a magnet housing covering the magnet, the magnet housing is rotatably connected to the housing by a rotary fixing pin through the housing, and the housing has arc slots to receive the connecting rod therethrough.

Two arc slots may be formed in the housing symmetrically with the rotary fixing pin therebetween.

The shift lever may include a lever bar receiving operational force, an upper block integrally combined with the lever bar, and a lower block connected to lower portion of the upper block and rotatably coupled to the vehicle body, wherein the lever bar is selected in a shifting range, and wherein the connection groove is formed in the lower block.

The housing may be fixed to the outer side of a base bracket fixed to the vehicle body, the base bracket covering the shift lever, and the base bracket may have an arc hole at a position corresponding to the arc slots of the housing to receive a distal end portion of the connecting rod therethrough.

In another aspect of the present invention, a method of controlling a vehicle equipped with the shifting range sensing apparatus may include receiving a signal from an inhibitor switch mounted in a transmission, receiving a signal from the Hall sensor of the shifting range sensing apparatus, determining whether the signal of the inhibitor switch and the signal from the shifting range sensing apparatus indicate the same shifting range, and taking an emergency measure by performing a fail-safe function, when it is determined that the signals do not indicate the same shifting range in the determining of whether the signals indicate the same shifting range.

Taking of an emergency measure may include informing that the signal of the inhibitor switch and the signal from the shifting range sensing apparatus are not the same, and controlling signal selection to control the transmission on the basis of the signal from the shifting range sensing apparatus.

In further another aspect of the present invention, a shifting range sensing system may include a shift lever pivotally connected to a vehicle body, a shift range sensing apparatus to sense a pivotal movement of the shift lever, an inhibitor switch mounted in a transmission, and a controller taking an emergency measure when a signal of the inhibitor switch and a signal of the shifting range sensing apparatus do not indicate the same shifting range, wherein the shifting range sensing system may include a housing fixed to the vehicle body, a magnet rotatably connected to the housing therein, a power transfer unit transmitting the pivotal movement of the shift lever to the magnet in accordance with the pivotal movement of the shift lever to move the magnet, and a Hall sensor fixed in the housing to sense the movement of the magnet and send a signal to the controller.

According to the present invention, it is possible to ensure safety in vehicle control, by providing accurate information on a shift range selected by a driver supplementarily from the operation of a shift lever, even if an inhibitor switch mounted in a transmission transmits incorrect information due to a failure.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
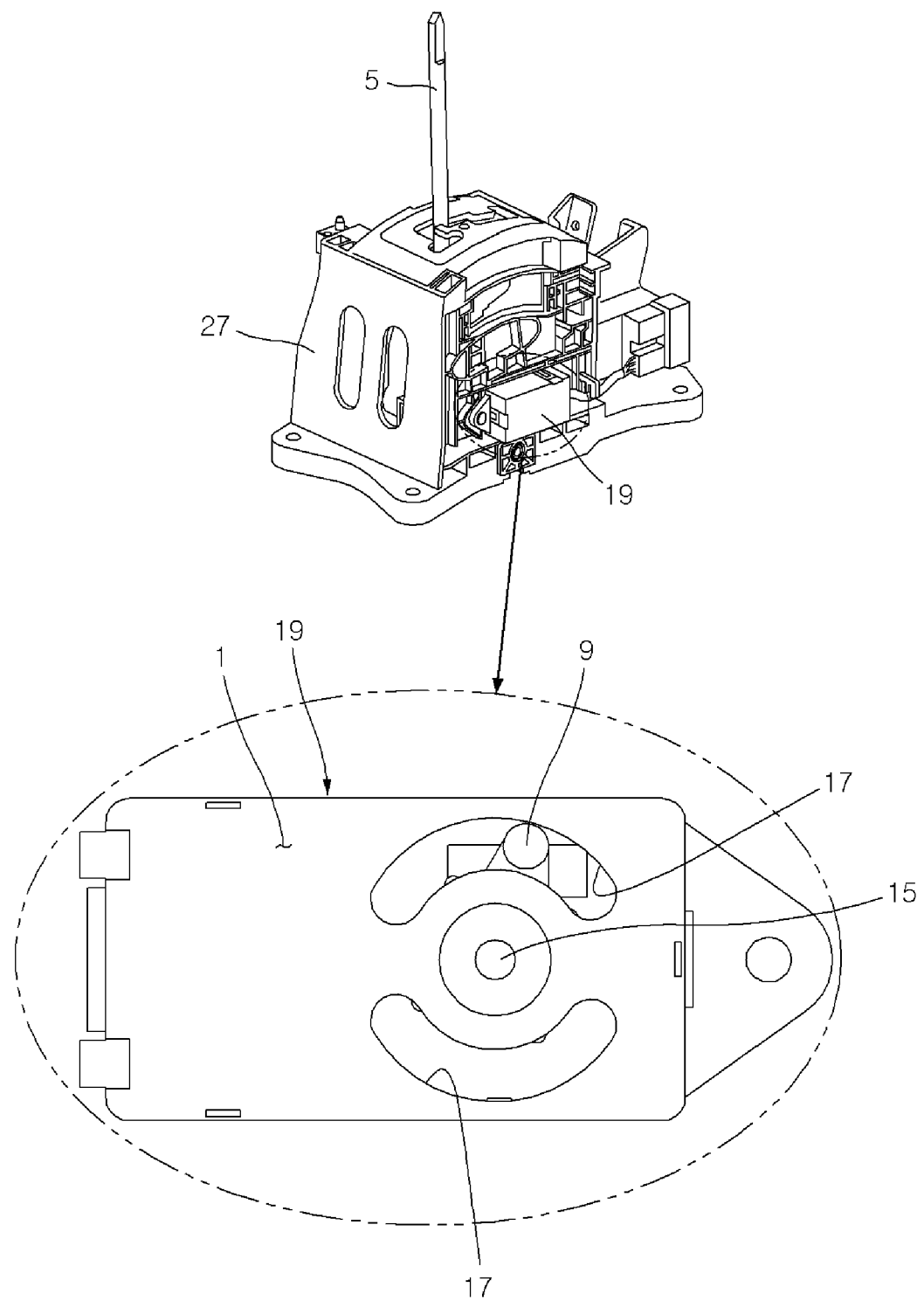
FIG. 1 is a view showing when a shift range sensing apparatus according to an exemplary embodiment of the present invention has been mounted.
Figure 2:
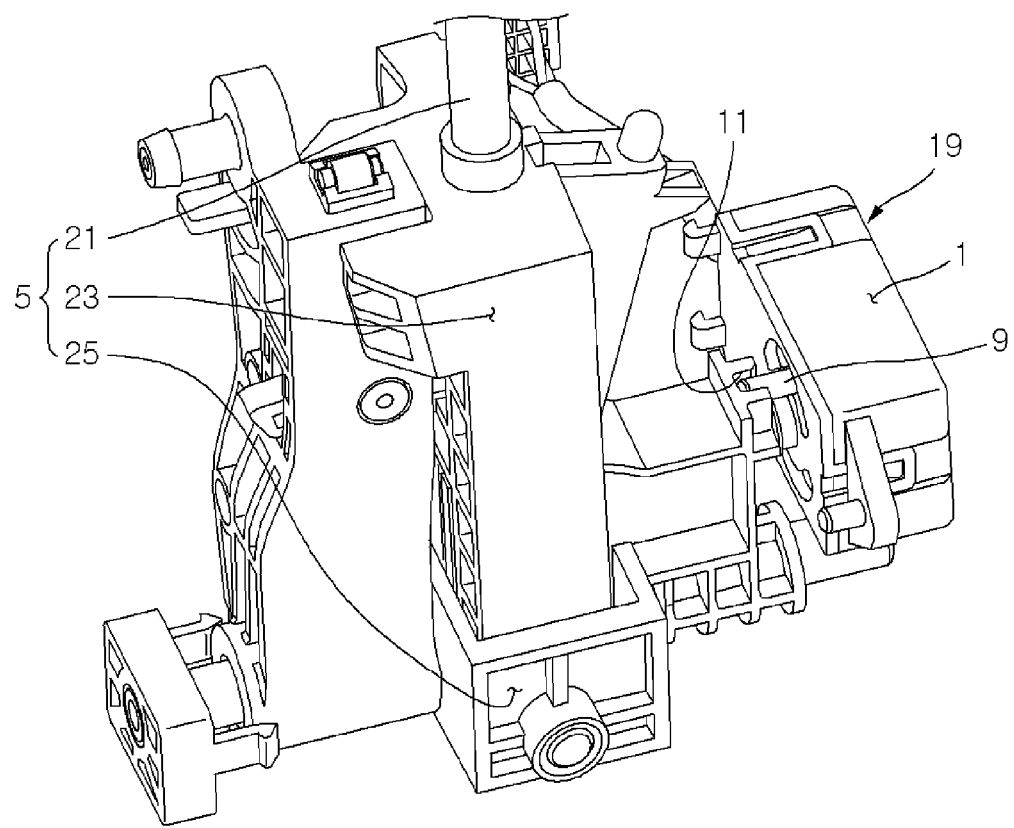
FIG. 2 is a view illustrating the connection structure of a shift lever and a shifting range sensing apparatus according to an exemplary embodiment of the present invention.
Figure 3:
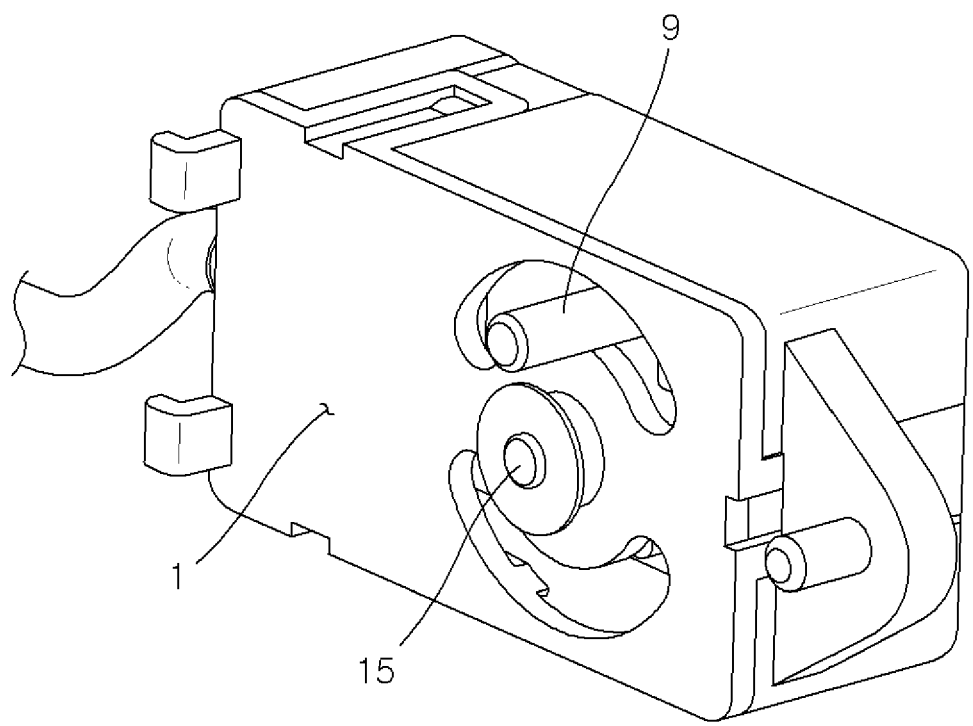
FIG. 3 is a view showing the external appearance of a shifting range sensing apparatus according to an exemplary embodiment of the present invention.
Figure 4:
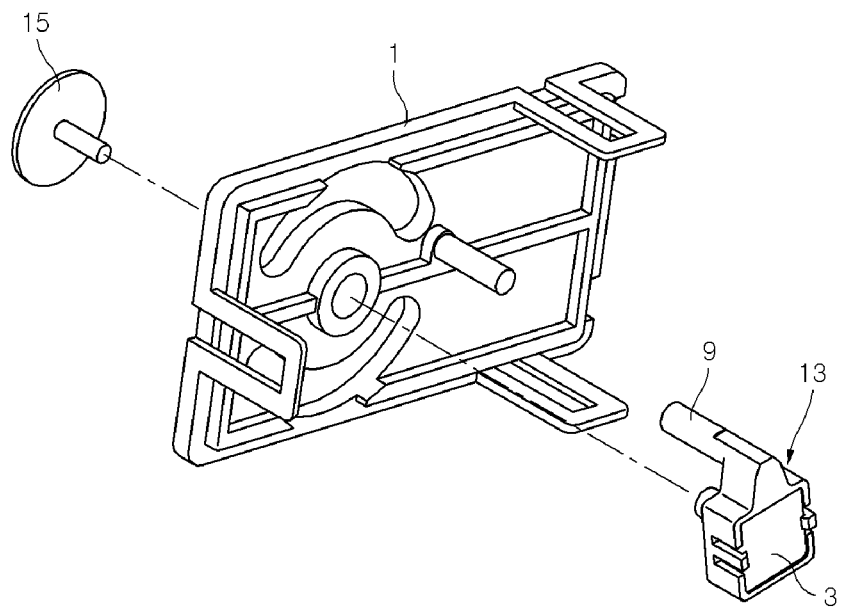
FIG. 4 is a view illustrating the structure of a magnet housing and a housing which are combined to be used in the exemplary embodiment shown in FIG. 3.
Figure 5:
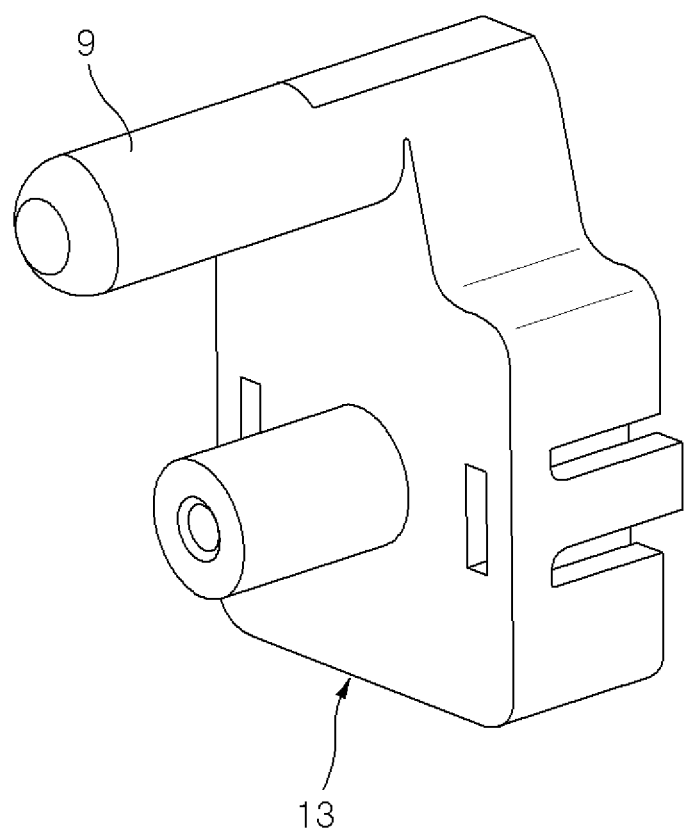
FIG. 5 is a view showing in detail the magnet housing and a connecting rod of FIG. 4.
Figure 6:
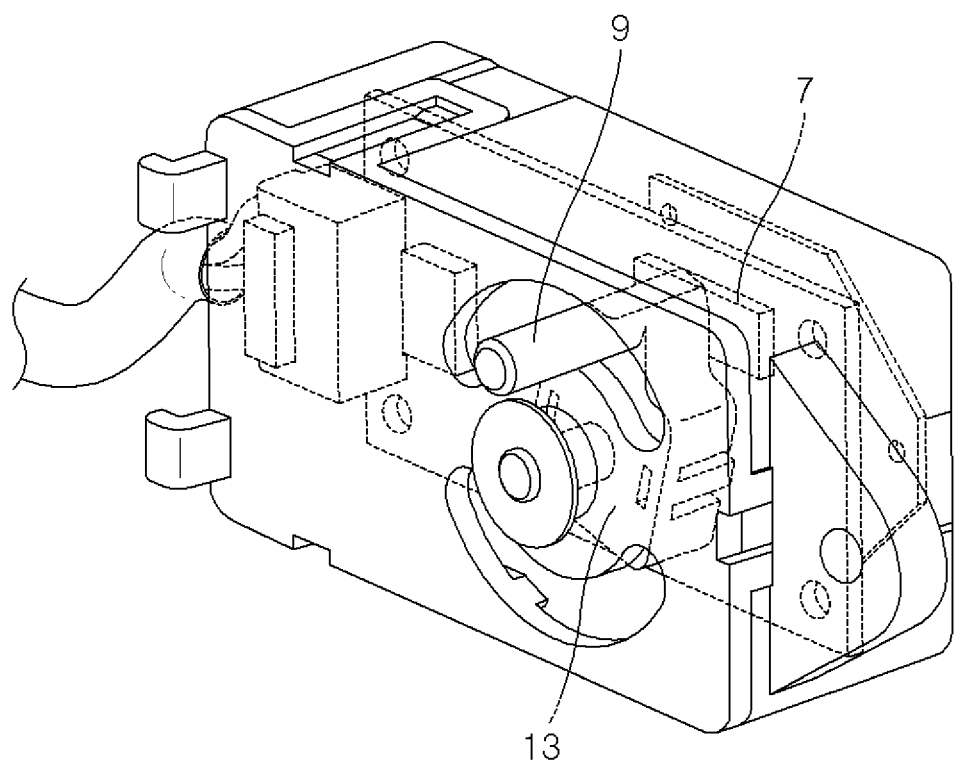
FIG. 6 is a view schematically showing the internal structure of the shifting range sensing apparatus of the exemplary embodiment shown in FIG. 3.
Figure 7:
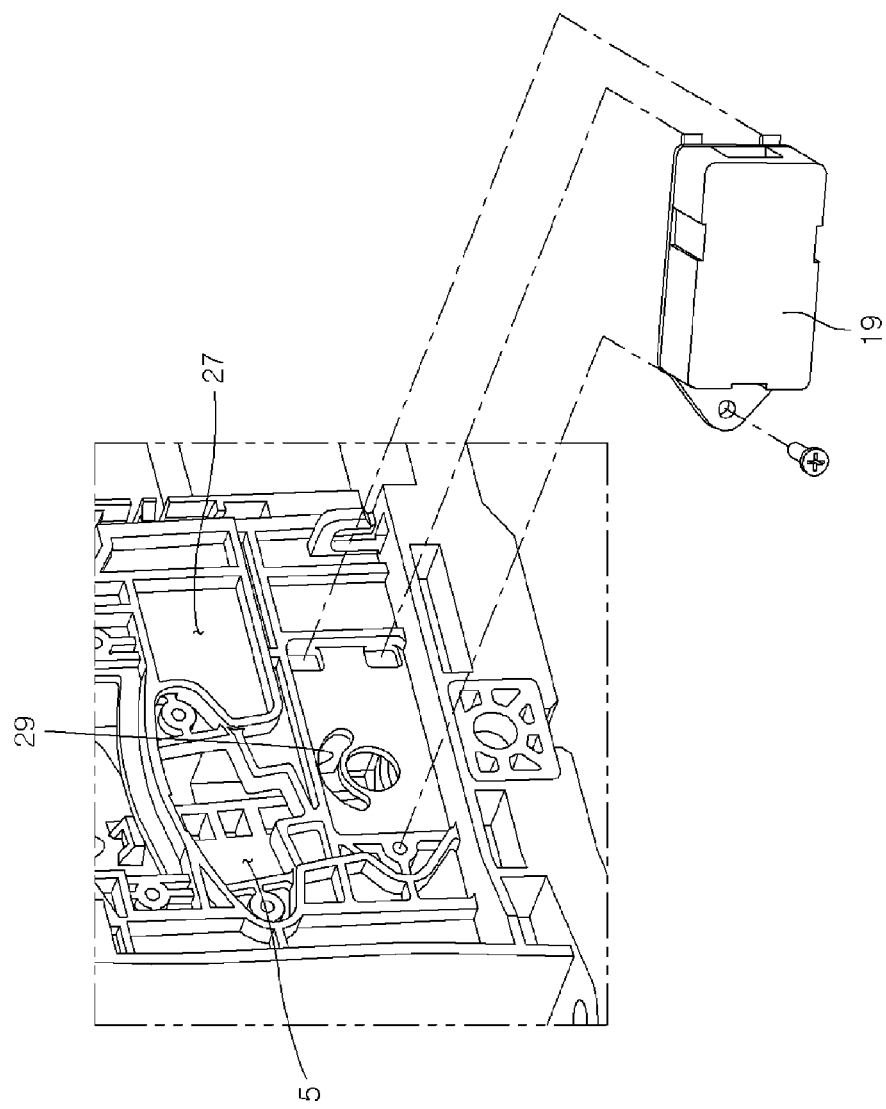
FIG. 7 is a view showing a structure when the shifting range sensing apparatus according to an exemplary embodiment of the present invention is mounted on a base bracket.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 7, an embodiment of the present invention includes a housing 1 fixed with respect to a vehicle body, a magnet 3 rotatably disposed in housing 1, a power transfer unit transmitting rotation of shift lever 5 to rotation of magnet 3 in accordance with the rotational state of shift lever 5 such that magnet 3 rotates, and a Hall sensor 7 disposed in housing 1 to sense movement of magnet 3.

That is, movement of magnet 3 which is generated by movement of shift lever 5 is sensed by Hall sensor 7, it is determined from the change which shifting range was selected by shift lever 5, by a separate controller, and a signal is supplied to a transmission controller.

In the present embodiment, the power transfer unit includes a connecting rod 9 integrally connected with magnet 3 and protruding outside from housing 1 and a connection groove 11 formed to insert connecting rod 9 in shift lever 5.

Connecting rod 9 is integrally formed with magnet housing 13 covering magnet 3 and magnet housing 13 is disposed rotatably with respect to housing 1 by rotary fixing pin 15 through housing 1.

Housing 1 has arc slots 17 to move connecting rod 9.

Figure 8:
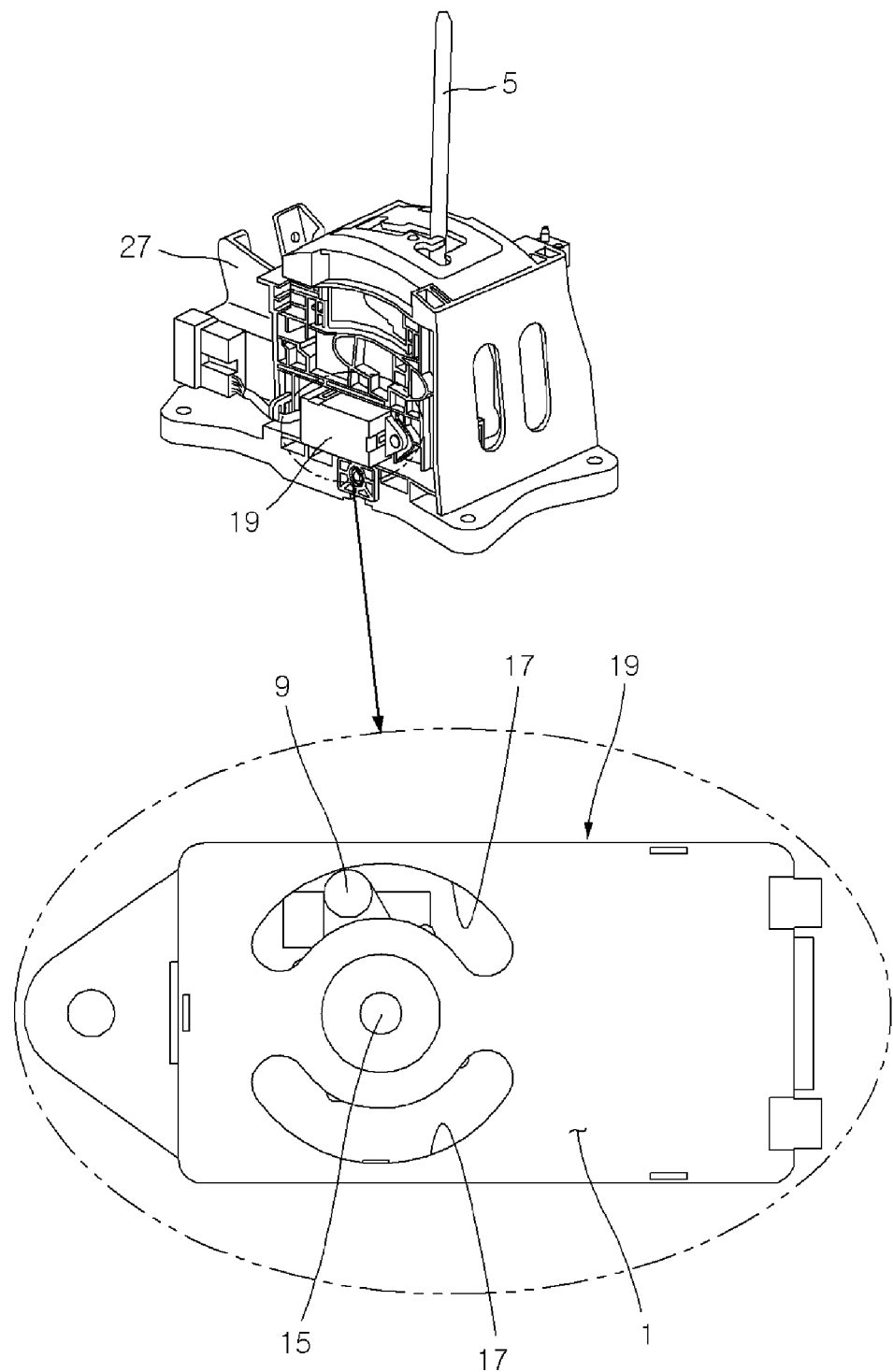
FIG. 8 is a view showing an example when a shifting range sensing apparatus according to an exemplary embodiment of the present invention is mounted in the opposite direction to FIG. 1.

Further, the two arc slots 17 is formed symmetrically with rotary fixing pin 15 therebetween, and as shown in FIG. 8, it is easy to be diverted, when shifting range sensing apparatus 19 should be mounted in the opposite direction to the embodiment shown in FIG. 1.

Shift lever 5 includes a lever bar 21 receiving the operational force from a driver, an upper block 23 integrally combined with lever bar 21, and a lower block 25 disposed to rotate when lever bar 21 is selected in a shifting range, rotatably supporting upper block 23.

Therefore, the operational force 5 of shift lever 5 from the driver is transmitted through lever bar 21, and when lever bar 21 is moved to select a transmission range, lower block 25 rotates, such that connection groove 11 is formed in lower block 25.

Without separately having upper block 23 and lower block 25, as described above, shift lever 5 may be simplified with a configuration having a member corresponding to lever bar 21 and forming connection groove 11 thereto.

Housing 1 is fixed to the outer side of a base bracket 27 covering shift lever 5 and base bracket 27 has an arc hole 29 at the position corresponding to arc slots 17.

Therefore, with the same basic structure of a shifting device for a DCT and a shifting device of a common automatic transmission, shifting range sensing apparatus 19 of the present invention can be easily mounted or removed, if needed, such that it is possible to reduce the manufacturing cost by sharing the parts.

Figure 9:
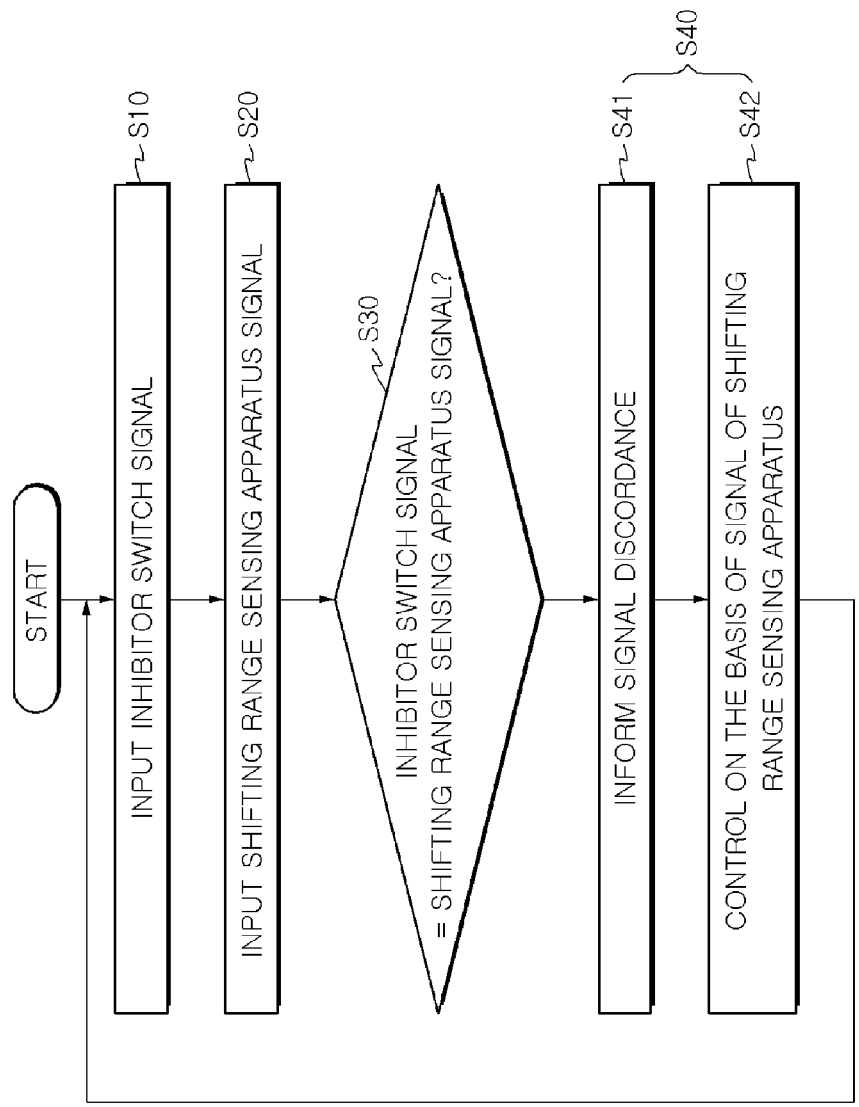
FIG. 9 is a flowchart illustrating an embodiment of a method controlling a vehicle equipped with a shift range sensing apparatus according to an exemplary embodiment of the present invention.

In a vehicle equipped with shifting range sensing apparatus described above, It is possible to more safely control the vehicle, using shifting range sensing apparatus 19, and as shown in FIG. 9, the vehicle can be controlled by receiving a signal from inhibitor switch mounted in the transmission (S10), receiving a signal from shifting range sensing apparatus 19 (S20), determining whether the signal of the inhibitor switch and the signal from shifting range sensing apparatus 19 indicate the same shifting range (S30), and taking an emergency measure by performing a fail-safe function, when it is determined that the signals do not indicate the same shifting range in the determining of whether the signals indicate the same shifting range (S30 and S40).

The taking of an emergency measure (S40) may include informing the driver that the signal of the inhibitor switch and the signal from shifting range sensing apparatus 19 are not the same (S41) and controlling signal selection to control the transmission preferentially on the basis of the signal from shifting range sensing apparatus 19 (S42).

That is, when the signal of the inhibitor switch may not be the same as the signal of shifting range sensing apparatus 19, the driver is warned the circumstance with display or voice to take a measure against it.

In the present embodiment, the transmission is controlled preferentially on the basis of the signal of shifting range sensing apparatus 19 while ignoring the signal of the inhibitor switch in the controlling signal selection (S42), and this is because it is considered more safe to control the vehicle to correspond to the driver's intention, in preparation for when a failure of the inhibitor switch.

However, it may be possible to give priority to safety by stopping the vehicle without the controlling of signal selection (S42), when a signal different form the signal of the inhibitor switch is generated, as described above, because an error in shifting range sensing apparatus 19 of the present invention can never be eliminated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting range sensing apparatus, comprising:
   a housing fixed to a vehicle body;
   a shift lever pivotally connected to the vehicle body;
   a magnet rotatably connected to the housing therein;
   a power transfer unit transmitting a pivotal rotation of the shift lever to the magnet in accordance with a rotation of the shift lever to move the magnet; and
   a Hall sensor fixed in the housing to sense the movement of the magnet;
   wherein the power transfer unit includes:
      a connecting rod connected with a portion of the magnet and protruding outside the housing, wherein the portion of the magnet is spaced from a rotation center of the magnet; and
      a connection groove formed in the shift lever to rotatably receive the connecting rod therein;
   wherein the connecting rod is integrally formed with a magnet housing covering the magnet;
   wherein the magnet housing is rotatably connected to the housing by a rotary fixing pin through the housing;
   wherein the rotary fixing pin forms a rotation center of the magnet housing; and
   wherein the housing has arc slots to receive the connecting rod therethrough.

2. The shifting range sensing apparatus as defined in claim 1, wherein two arc slots are formed in the housing symmetrically with the rotary fixing pin therebetween.

3. The shifting range sensing apparatus as defined in claim 1, wherein the shift lever includes:
   a lever bar receiving operational force;
   an upper block integrally combined with the lever bar; and
   a lower block connected to lower portion of the upper block and rotatably coupled to the vehicle body,
   wherein the lever bar is selected in a shifting range, and
   wherein the connection groove is formed in the lower block.

4. The shifting range sensing apparatus as defined in claim 3, wherein the housing is fixed to the outer side of a base bracket fixed to the vehicle body, the base bracket covering the shift lever, and
   the base bracket has an arc hole at a position corresponding to the arc slots of the housing to receive a distal end portion of the connecting rod therethrough.

5. A transmission of a vehicle which is equipped with the shifting range sensing apparatus as defined in claim 1.

6. A vehicle equipped with the shifting range sensing apparatus as defined in claim 1.

* * * * *